US010979997B2

(12) United States Patent
Xu

(10) Patent No.: US 10,979,997 B2
(45) Date of Patent: Apr. 13, 2021

(54) INFORMATION TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/913,122

(22) Filed: Jun. 26, 2020

(65) Prior Publication Data
US 2020/0329453 A1 Oct. 15, 2020

Related U.S. Application Data

(63) Continuation of application No. PCT/CN2019/085824, filed on May 7, 2019.

(30) Foreign Application Priority Data

May 18, 2018 (CN) .......................... 201810483352.5
May 21, 2018 (CN) .......................... 201810488684.2

(51) Int. Cl.
*H04W 4/00* (2018.01)
*H04W 68/00* (2009.01)
(Continued)

(52) U.S. Cl.
CPC ......... *H04W 68/005* (2013.01); *H04L 5/0053* (2013.01); *H04W 4/90* (2018.02); *H04W 72/042* (2013.01); *H04W 72/1273* (2013.01)

(58) Field of Classification Search
CPC ... H04W 68/005; H04W 72/042; H04W 4/90; H04W 72/1273; H04L 5/0053
(Continued)

(56) References Cited

U.S. PATENT DOCUMENTS 9,398,581 B2 * 7/2016 Dai ..................... H04L 5/0053
2015/0110015 A1 * 4/2015 Dai ..................... H04W 72/042
370/329
(Continued)

FOREIGN PATENT DOCUMENTS

CN          106454694        2/2017
WO       WO2017193347 A1   11/2017
WO       WO 2018063048 A1   4/2018

OTHER PUBLICATIONS

Guangdong OPPO Mobile Telecommunications Corp. Ltd., International Search Report and Written Opinion, PCT/CN2019/085824, dated Jul. 25, 2019, 8 pgs.
(Continued)

*Primary Examiner* — Chuong T Ho
(74) *Attorney, Agent, or Firm* — Morgan, Lewis & Bockius LLP

(57) ABSTRACT

Provided are an information transmission method, a terminal device, and a network device. The network device is capable of flexibly using different types of downlink control information according to different situations, and is also capable of effectively controlling the total indication overheads. The method comprises: a terminal device receiving downlink control information of a scheduling paging message, wherein the downlink control information comprises first indication information, and the first indication information is used for indicating the type of control information carried in the downlink control information; and the terminal device determining, according to the first indication information,
(Continued)

the type of the control information carried in the downlink control information.

12 Claims, 5 Drawing Sheets

(51) Int. Cl.
    *H04W 4/90* (2018.01)
    *H04L 5/00* (2006.01)
    *H04W 72/04* (2009.01)
    *H04W 72/12* (2009.01)

(58) Field of Classification Search
    USPC .................................................. 370/329, 330
    See application file for complete search history.

(56) References Cited

U.S. PATENT DOCUMENTS

| | | | | |
|---|---|---|---|---|
| 2019/0082457 | A1* | 3/2019 | Zhou | H04L 5/0094 |
| 2019/0124631 | A1* | 4/2019 | Ren | H04W 72/0466 |
| 2019/0239187 | A1* | 8/2019 | Islam | H04L 5/0094 |
| 2019/0349902 | A1* | 11/2019 | Soriaga | H04W 72/042 |

OTHER PUBLICATIONS

Qualcomm Incorporated, "Paging Design Consideration," 3GPP TSG-RAN WG1 Meeting #92bis R1-1804777, Apr. 7, 2018, 5 pgs.

VIVO, "Remaining Issues on Paging," 3GPP TSG RAN WG1 Meeting #93 R1-1806034, May 12, 2018, 3 pgs.

LG Electronics, "Paging design in NR," 3GPP TSG RAN WG1 Meeting #92bis, R1-1804537, Sanya, China, Apr. 16-20, 2018, 5 pgs.

MediaTek Inc., "Remaining Issues for Paging," 3GPP TSG RAN WG1 Meeting #92bis, R1-1804054, Sanya, China, Apr. 16-20, 2018, 2 pgs.

Guangdong OPPO Mobile Telecommunications Corp. Ltd., Extended European Search Report, EP19804119.6, dated Feb. 22, 2021, 10 pgs.

Guangdong OPPO Mobile Telecommunications Corp. Ltd., First Office Acton-CN202010468216.3, dated Dec. 2, 2020, 18 pgs.

Vivo, "Remaining Issues on eMBB DCI format," 3GPP TSG RAN WG1 Meeting #93, R1-1806058, Busan, Korea, May 21-25, 2018, 6 pgs.

* cited by examiner

INFORMATION TRANSMISSION METHOD, TERMINAL DEVICE, AND NETWORK DEVICE

CROSS-REFERENCE TO RELATED APPLICATIONS

This application is a continuation of PCT Application No. PCT/CN2019/085824, entitled "INFORMATION TRANSMISSION METHOD, TERMINAL DEVICE, AND NETWORK DEVICE" filed May 7, 2019, which claims priority to and the benefit of Chinese Patent Application No. 201810483352.5, entitled "INFORMATION TRANSMISSION METHOD, TERMINAL DEVICE, AND NETWORK DEVICE" filed May 18, 2018 and Chinese Patent Application No. 201810488684.2, entitled "INFORMATION TRANSMISSION METHOD, TERMINAL DEVICE, AND NETWORK DEVICE" filed May 21, 2018, all of which are incorporated herein by reference in their entirety.

TECHNICAL FIELD

Embodiments of the present disclosure generally relate to communication technologies, and more particularly, to methods for information transmission, a terminal device and a network device.

BACKGROUND

In a New Radio (NR) system, downlink control information (DCI) carried in Physical Downlink Control Channel (PDCCH) may support scheduling of a paging message may carry a short message in addition to normal scheduling information. The short message may be a message such as a system information update indication (systemInfoModification), a commercial alerting indication (cmas-Indication), and an earthquake and tsunami warning indication (etws-Indication). The DCI for scheduling the paging message either carries only the scheduling information or carries the short message, and in the former case, the short message is carried in a Physical Downlink Shared Channel (PDSCH) carrying the paging message. However, how to make the terminal device determine which one of the above cases the DCI for scheduling the paging message belongs to is a problem that needs to be solved.

SUMMARY

Embodiments of the present disclosure provide a method for information transmission, a terminal device and a network device. The network device can flexibly use different downlink control information types depending on different situations, and can also effectively control the total indication overhead.

According to a first aspect, there is provided a method for information transmission, including:

receiving, by a terminal device, downlink control information for scheduling a paging message, wherein the downlink control information includes first indication information, the first indication information being used for indicating a type of control information carried in the downlink control information; and determining, by the terminal device, the type of the control information carried in the downlink control information according to the first indication information.

In embodiments of the present disclosure, the first indication information in the downlink control information for scheduling the paging message can indicate the type of the control information carried in the downlink control information, so that the terminal device can determine the type of the control information carried in the downlink control information.

Further, the network device can flexibly use different downlink control information types depending on different situations, and can also effectively control the total indication overhead.

According to an exemplary embodiment, the terminal device may be in a Radio Resource Control (RRC) idle state, or may be in an RRC connected state.

According to exemplary embodiments, the type of the control information carried in the downlink control information includes at least one of the following type information:

scheduling information for PDSCH carrying the paging message, a short message, the scheduling information for the PDSCH carrying the paging message and the short message, or reserved information for a terminal device in Rel 15.

According to exemplary embodiments, the first indication information includes first indication bits, wherein:

when the first indication bits are first bits, the first indication information indicates that the type of the control information carried in the downlink control information is the scheduling information for the PDSCH carrying the paging message; or when the first indication bits are second bits, the first indication information indicates that the type of the control information carried in the downlink control information is the short message; or when the first indication bits are third bits, the first indication information indicates that the type of the control information carried in the downlink control information is the scheduling information for the PDSCH carrying the paging message and the short message; or when the first indication bits is a fourth bits, the first indication information indicates that the type of the control information carried in the downlink control information is the reserved information for the terminal device in Rel 15 version.

According to exemplary embodiments, the type of the control information carried in the downlink control information includes at least one of the following type information:

scheduling information for Physical Downlink Shared Channel (PDSCH) carrying the paging message, a short message, the scheduling information for the PDSCH carrying the paging message and the short message, or downlink control information for an enhanced paging mechanism in a Rel 16 (Release 16) version or higher.

It should be noted that in the Rel-16 version or higher, the transmission of paging messages may be further enhanced, which may lead to changes in the DCI for scheduling the paging message.

According to exemplary embodiments, the short message includes at least one of a system information update indication (systemInfoModification), a commercial alerting indication (cmas-Indication), or an earthquake and tsunami warning indication (etws-Indication).

According to exemplary embodiments, the type of the control information carried in the downlink control information includes:

scheduling information for PDSCH which carries the paging message, a short message, the scheduling information for the PDSCH which carries the paging message and the short message, scheduling information for PDSCH which carries the paging message in a Rel 16 version or higher, a short message in the Rel 16 version or higher, or the scheduling information for the PDSCH which carries the paging message and the short message in the Rel 16 version or higher.

It should be noted that, when it is mentioned that the type of the control information carried in the downlink control information is the scheduling information for PDSCH which carries the paging message, the short message, or the scheduling information for the PDSCH which carries the paging message and the short message, it may be understood that the type refers to the scheduling information for PDSCH which carries the paging message, the short message, or the scheduling information for the PDSCH which carries the paging message and the short message in Rel 15.

According to exemplary embodiments, the first indication information includes first indication bits, wherein:

when the first indication bits are first bits, the first indication information indicates that the type of the control information carried in the downlink control information is the scheduling information for the PDSCH carrying the paging message; or when the first indication bits are second bits, the first indication information indicates that the type of the control information carried in the downlink control information is the short message; or when the first indication bits are third bits, the first indication information indicates that the type of the control information carried in the downlink control information is the scheduling information for the PDSCH carrying the paging message and the short message; or when the first indication bits are fourth bits, the first indication information indicates that the type of the control information carried in the downlink control information is the downlink control information for the enhanced paging mechanism in the Rel 16 version or higher.

According to exemplary embodiments, the first indication bits include 2 bits.

Therefore, in embodiments of the present disclosure, two bits in the downlink control information for scheduling the paging message can be used to indicate the three types of DCI under Rel-15 and to indicate whether the type is the enhanced paging downlink control information in the Rel 16 version or higher. In this way, the network device can flexibly use different downlink control information types depending on different situations, and can also effectively control the total indication overhead.

According to exemplary embodiments, when the first indication bits are the fourth bits, the type of the control information carried in the downlink control information further includes:

scheduling information for PDSCH carrying the paging message in the Rel 16 version or higher, a short message in the Rel 16 version or higher, or the scheduling information for the PDSCH carrying the paging message and the short message in the Rel 16 version or higher.

According to exemplary embodiments, the first indication information includes second indication bits for indicating the scheduling information for PDSCH carrying the paging message in the Rel 16 version or higher, the short message in the Rel 16 version or higher, or the scheduling information for the PDSCH carrying the paging message and the short message in the Rel 16 version or higher.

According to exemplary embodiments, when the first indication bits are the fourth bits and the second indication bits are fifth bits, the first indication information indicates that the type of the control information carried in the downlink control information is the scheduling information for PDSCH carrying the paging message in the Rel 16 version or higher; or when the first indication bits are the fourth bits and the second indication bits are sixth bits, the first indication information indicates that the type of the control information carried in the downlink control information is the short message in the Rel 16 version or higher; or when the first indication bits are the fourth bits and the second indication bits are seventh bits, the first indication information indicates that the type of the control information carried in the downlink control information is the scheduling information for the PDSCH carrying the paging message and the short message in the Rel 16 version or higher.

According to exemplary embodiments, the second indication bits include 2 bits.

Therefore, in embodiments of the present disclosure, when the first indication bit are the fourth bits, the second indication bits (2 bits) in the downlink control information for scheduling the paging message may be further used to indicate the scheduling information for PDSCH carrying the paging message in the Rel 16 version or higher, or to indicate the short message in the Rel 16 version or higher, or to indicate the scheduling information for the PDSCH carrying the paging message and the short message in the Rel 16 version or higher.

According to exemplary embodiments, the first indication information includes a third indication bit;

when the third indication bit is an eighth bit, the first indication information indicates that the type of the control information carried in the downlink control information is the scheduling information for the PDSCH carrying the paging message and the short message; or when the third indication bit is a ninth bit, the first indication information indicates that the type of the control information carried in the downlink control information is the short message.

According to exemplary embodiments, when the third indication bit is the ninth bit, there is a bit field for the scheduling information for the PDSCH carrying the paging message, and the bit field does not indicate the scheduling information.

According to exemplary embodiments, when the third indication bit is the ninth bit, there is no bit field for the scheduling information for the PDSCH carrying the paging message, and a bit field for carrying the short message is at a position for a short message in the downlink control information or at a position for scheduling information for the PDSCH carrying the paging message.

According to exemplary embodiments, the third indication bit includes 1 bit.

According to a second aspect, there is provided a method for information transmission, including:

sending, by a network device, downlink control information for scheduling a paging message to a terminal device, wherein the downlink control information includes first indication information, the first indication information being used for indicating a type of control information carried in the downlink control information to the terminal device.

Therefore, in embodiments of the present disclosure, the first indication information in the downlink control information for scheduling the paging message can indicate the type of the control information carried in the downlink control information, so that the network device can flexibly use different downlink control information types depending on different situations, and can also effectively control the total indication overhead.

According to exemplary embodiments, the network device may be an access network device or a core network device.

According to exemplary embodiments, the type of the control information carried in the downlink control information includes at least one of the following type information:

scheduling information for PDSCH carrying the paging message, a short message, the scheduling information for the PDSCH carrying the paging message and the short message, or reserved information for a terminal device in Rel 15.

According to exemplary embodiments, the first indication information includes first indication bits, wherein:

when the first indication bits are first bits, the first indication information indicates that the type of the control information carried in the downlink control information is the scheduling information for the PDSCH carrying the paging message; or when the first indication bits are second bits, the first indication information indicates that the type of the control information carried in the downlink control information is the short message; or when the first indication bits are third bits, the first indication information indicates that the type of the control information carried in the downlink control information is the scheduling information for the PDSCH carrying the paging message and the short message; or when the first indication bits are fourth bits, the first indication information indicates that the type of the control information carried in the downlink control information is the reserved information for the terminal device in Rel 15 version.

According to exemplary embodiments, the type of the control information carried in the downlink control information includes at least one of the following type information:

scheduling information for PDSCH carrying the paging message, a short message, the scheduling information for the PDSCH carrying the paging message and the short message, or downlink control information for an enhanced paging mechanism in a Rel 16 version or higher.

According to exemplary embodiments, the short message includes at least one of a system information update indication, a commercial alerting indication, or an earthquake and tsunami warning indication.

According to exemplary embodiments, the first indication information includes first indication bits, wherein:

when the first indication bits are first bits, the first indication information indicates to the terminal device that the type of the control information carried in the downlink control information is the scheduling information for the PDSCH carrying the paging message; or when the first indication bits are second bits, the first indication information indicates to the terminal device that the type of the control information carried in the downlink control information is the short message; or when the first indication bits are third bits, the first indication information indicates to the terminal device that the type of the control information carried in the downlink control information is the scheduling information for the PDSCH carrying the paging message and the short message; or when the first indication bits are fourth bits, the first indication information indicates to the terminal device that the type of the control information carried in the downlink control information is the downlink control information for the enhanced paging mechanism in the Rel 16 version or higher.

According to exemplary embodiments, the first indication bits include 2 bits.

Therefore, in embodiments of the present disclosure, two bits in the downlink control information for scheduling the paging message can be used to indicate the three types of DCI under Rel-15 and to indicate whether the type is the enhanced paging downlink control information in the Rel 16 version or higher. In this way, the network device can flexibly use different downlink control information types depending on different situations, and can also effectively control the total indication overhead.

According to exemplary embodiments, when the first indication bits are the fourth bits, the type of the control information carried in the downlink control information further includes:

scheduling information for PDSCH carrying the paging message in the Rel 16 version or higher, a short message in the Rel 16 version or higher, or the scheduling information for the PDSCH carrying the paging message and the short message in the Rel 16 version or higher.

According to exemplary embodiments, the first indication information includes second indication bits for indicating the scheduling information for PDSCH carrying the paging message in the Rel 16 version or higher, the short message in the Rel 16 version or higher, or the scheduling information for the PDSCH carrying the paging message and the short message in the Rel 16 version or higher.

According to exemplary embodiments, when the first indication bits are the fourth bits and the second indication bits are fifth bits, the first indication information indicates to the terminal device that the type of the control information carried in the downlink control information is the scheduling information for PDSCH carrying the paging message in the Rel 16 version or higher; or when the first indication bits are the fourth bits and the second indication bits are sixth bits, the first indication information indicates to the terminal device that the type of the control information carried in the downlink control information is the short message in the Rel 16 version or higher; or when the first indication bits are the fourth bits and the second indication bits are seventh bits, the first indication information indicates to the terminal device that the type of the control information carried in the downlink control information is the scheduling information for the PDSCH carrying the paging message and the short message in the Rel 16 version or higher.

According to exemplary embodiments, the second indication bits include 2 bits.

Therefore, in embodiments of the present disclosure, when the first indication bit are the fourth bits, the second indication bits (2 bits) in the downlink control information for scheduling the paging message may be further used to indicate the scheduling information for PDSCH carrying the paging message in the Rel 16 version or higher, or to indicate the short message in the Rel 16 version or higher, or to indicate the scheduling information for the PDSCH carrying the paging message and the short message in the Rel 16 version or higher.

According to exemplary embodiments, the first indication information includes a third indication bit, wherein:

when the third indication bit is an eighth bit, the first indication information indicates that the type of the control information carried in the downlink control information is the scheduling information for the PDSCH carrying the paging message and the short message; or when the third indication bit is a ninth bit, the first indication information indicates that the type of the control information carried in the downlink control information is the short message.

According to exemplary embodiments, when the third indication bit is the ninth bit, there is a bit field for the scheduling information for the PDSCH carrying the paging message, and the bit field does not indicate the scheduling information.

According to exemplary embodiments, when the third indication bit is the ninth bit, there is no bit field for the scheduling information for the PDSCH carrying the paging message, and a bit field for carrying the short message is at a position for a short message in the downlink control information or at a position for scheduling information for the PDSCH carrying the paging message.

According to exemplary embodiments, the third indication bit includes 1 bit.

According to a third aspect, there is provided a terminal device. The terminal device is configured to perform the methods according to the first aspect or any of the exemplary embodiments of the first aspect.

In particular, the terminal device includes functional modules for performing the methods according to the first aspect or any of the exemplary embodiments of the first aspect.

According to a fourth aspect, there is provided a network device. The network device is configured to perform the methods according to the second aspect or any of the exemplary embodiments of the second aspect.

In particular, the network device includes functional modules for performing the methods according to the second aspect or any of the exemplary embodiments of the second aspect.

According to a fifth aspect, there is provided a terminal device. The terminal device includes a memory and a processor. The memory is configured to store computer programs, and the processor is configured to call and execute the computer programs stored in the memory to perform the methods according to the first aspect or any of the exemplary embodiments of the first aspect.

According to a sixth aspect, there is provided a network device. The network device includes a memory and a processor. The memory is configured to store computer programs, and the processor is configured to call and execute the computer programs stored in the memory to perform the methods according to the second aspect or any of the exemplary embodiments of the second aspect.

According to a seventh aspect, there is provided a chip configured to perform the methods according to the first aspect or any of the exemplary embodiments of the first aspect, or to perform the methods according to the second aspect or any of the exemplary embodiments of the second aspect.

Specifically, the chip may include a process configured to call and execute computer programs stored in a memory to cause a device in which the chip is installed to perform the methods according to the first aspect or any of the exemplary embodiments of the first aspect, or to perform the methods according to the second aspect or any of the exemplary embodiments of the second aspect.

According to an eighth aspect, there is provided a computer storage medium. The computer storage medium is configured to store computer programs which cause a computer to perform the methods according to the first aspect or any of the exemplary embodiments of the first aspect, or to perform the methods according to the second aspect or any of the exemplary embodiments of the second aspect.

According to a ninth aspect, there is provided a computer program product including computer programs and instructions, which when executed, cause a computer to perform the methods according to the first aspect or any of the exemplary embodiments of the first aspect, or to perform the methods according to the second aspect or any of the exemplary embodiments of the second aspect.

According to a tenth aspect, there is provided a computer program. When the computer program is executed on a computer, the computer is caused to perform the methods according to the first aspect or any of the exemplary embodiments of the first aspect, or to perform the methods according to the second aspect or any of the exemplary embodiments of the second aspect.

According to an eleventh aspect, there is provided a wireless communication system, including a terminal device and a network device;

the terminal device is configured to receive downlink control information for scheduling a paging message, wherein the downlink control information includes first indication information, the first indication information being used for indicating a type of control information carried in the downlink control information; and determine the type of the control information carried in the downlink control information according to the first indication information;

the network device is configured to send the downlink control information for scheduling the paging message to the terminal device, wherein the downlink control information includes the first indication information, the first indication information being used for indicating the type of the control information carried in the downlink control information to the terminal device.

Specifically, the terminal device is configured to perform the methods according to the first aspect or any of the exemplary embodiments of the first aspect, and the network device is configured to perform the methods according to the second aspect or any of the exemplary embodiments of the second aspect.

DETAILED DESCRIPTION

Figure 1:
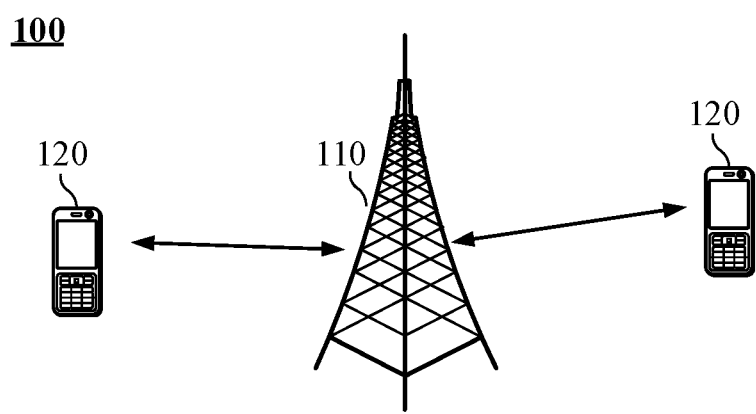
FIG. 1 is a schematic diagram showing an application scenario according to an embodiment of the present disclosure.

The technical solutions according to embodiments of the present disclosure will be described below with reference to drawings.

Embodiments of the present disclosure can be applied to various communication systems, such as, Global System of Mobile Communication (GSM) system, Code Division Multiple Access (CDMA) system, Wideband Code Division Multiple Access (WCDMA) system, General Packet Radio Service (GPRS) system, Long Term Evolution (LTE) system, advanced long term evolution (LTE-A) system, New Radio (NR) system, an evolution system of the NR system, LTE-based access to unlicensed spectrum (LTE-U) system, NR-based access to unlicensed spectrum (NR-U) system, Universal Mobile Telecommunication System (UMTS), Wireless Local Area Networks (WLAN) system, Wireless Fidelity (WiFi) system, next-generation communication systems or other communication systems, etc.

Generally speaking, traditional communication systems support a limited number of connections and are easy to implement. However, with the development of communication technologies, mobile communication systems will support not only traditional communications, but also for example, Device to Device (D2D) communication, Machine to Machine (M2M) communication, Machine Type Communication (MTC), and Vehicle to Vehicle (V2V) communication, etc. Embodiments of the present disclosure can also be applied to these communication systems.

According to some embodiments, the communication system in the embodiments of the present disclosure may be applied to a carrier aggregation (CA) scenario, a Dual Connectivity (DC) scenario, or a standalone (SA) network configuration.

Spectrum to which embodiments of the present disclosure may be applied is not limited herein. For example, embodiments of the present disclosure may be applied to licensed spectrum or unlicensed spectrum.

Embodiments of the present disclosure are described in conjunction with a network device and a terminal device. The terminal device may also be referred to as User Equipment (UE), access terminal, subscriber unit, user station, mobile station, mobile device, remote station, remote terminal, mobile equipment, user terminal, terminal, wireless communication device, user agent or user device, etc. The terminal device can be a station (STAION, ST) in the WLAN, or can be a cellular phone, a cordless phone, a Session Initiation Protocol (SIP) phone, a wireless local loop (Wireless Local Loop (WLL) station, a Personal Digital Assistant (PDA) device, a handheld device with wireless communication capabilities, a computing device, or other processing device connected to wireless modems, an in-vehicle device, a wearable device, or a terminal device in a next-generation communication system such as NR network, or a terminal device in a future evolved public land mobile network (PLMN), and so on.

As an example but not a limitation, in embodiments of the present disclosure, the terminal device may be a wearable device. A wearable device can also be referred to as a wearable smart device, which is a general term for wearable devices for which intellectualized designs are made based on common wearable devices using wearable technologies, for example, glasses, gloves, watches, clothing and shoes. A wearable device is a portable device that is worn directly on a human body or integrated into the user's clothes or accessories. Wearable devices are not only hardware devices, but also have powerful functions through software support, data interaction, and cloud interaction. Generalized wearable smart devices are full-featured and large-sized, and can realize complete or partial functions without relying on smartphones, such as smart watches or smart glasses. Some wearable devices may only focus on a certain type of application functions, and may cooperate with other devices such as smartphone, such as various smart bracelets and smart jewelry for physical sign monitoring.

The network device may be a device for communicating with a mobile device, and the network device may be an Access Point (AP) in WLAN, a Base Transceiver Station (BTS) in GSM or CDMA, or a base station (NodeB, NB) in WCDMA, or an evolved base station (Evolutional Node B, eNB or eNodeB) in LTE, or a relay station or access point, or a vehicle-mounted device, a wearable device, and a network device (gNB) in an NR network or a network device in a future evolved public land mobile network (PLMN), and so on.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, a base station), the cell may belong to a macro base station or a base station corresponding to a small cell. The small cell here can include: a metro cell, a micro cell, a pico cell, a femto cell, etc. These small cells have the characteristics of small coverage and low transmission power, and are suitable for providing high-speed data transmission services.

FIG. 1 exemplarily shows one network device and two terminal devices. According to other embodiments, the wireless communication system 100 may include multiple network devices and each network device may include other numbers of terminal devices within the coverage area. Embodiments of the present disclosure do not impose specific limitations on this.

According to embodiments, the wireless communication system 100 may further include other network entities such as Mobility Management Entity (MME), Access and Mobility Management Function (AMF), and embodiments of the present disclosure do not impose specific limitations on this.

In addition, various aspects or features of the present disclosure may be implemented as methods, devices, or articles using standard programming and/or engineering techniques. The term "article of manufacture" as used herein encompasses a computer program accessible from any computer-readable device, carrier, or medium. For example, the computer-readable medium may include, but is not limited to: magnetic storage devices (for example, hard disks, floppy disks, or magnetic tapes), optical disks (for example, compact discs (CD), digital versatile discs (DVD)), smart cards and flash memory devices (for example, Erasable Programmable Read-Only Memory (EPROM), cards, sticks or key drives, and so on). In addition, the various storage medium described herein may represent one or more devices and/or other machine-readable medium for storing information. The term "machine-readable medium" may include, but is not limited to, various mediums capable of storing, containing, and/or carrying instructions and/or data.

It should be understood that the terms "system" and "network" are often used interchangeably herein. The term "and/or" is used to describe an association relationship between associated objects, indicating that there can be three relationships, for example, A and/or B can mean: A exists only, both A and B exist, and B exists only. In addition, the character "/" generally indicates that the related objects are in an "or" relationship.

Figure 2:
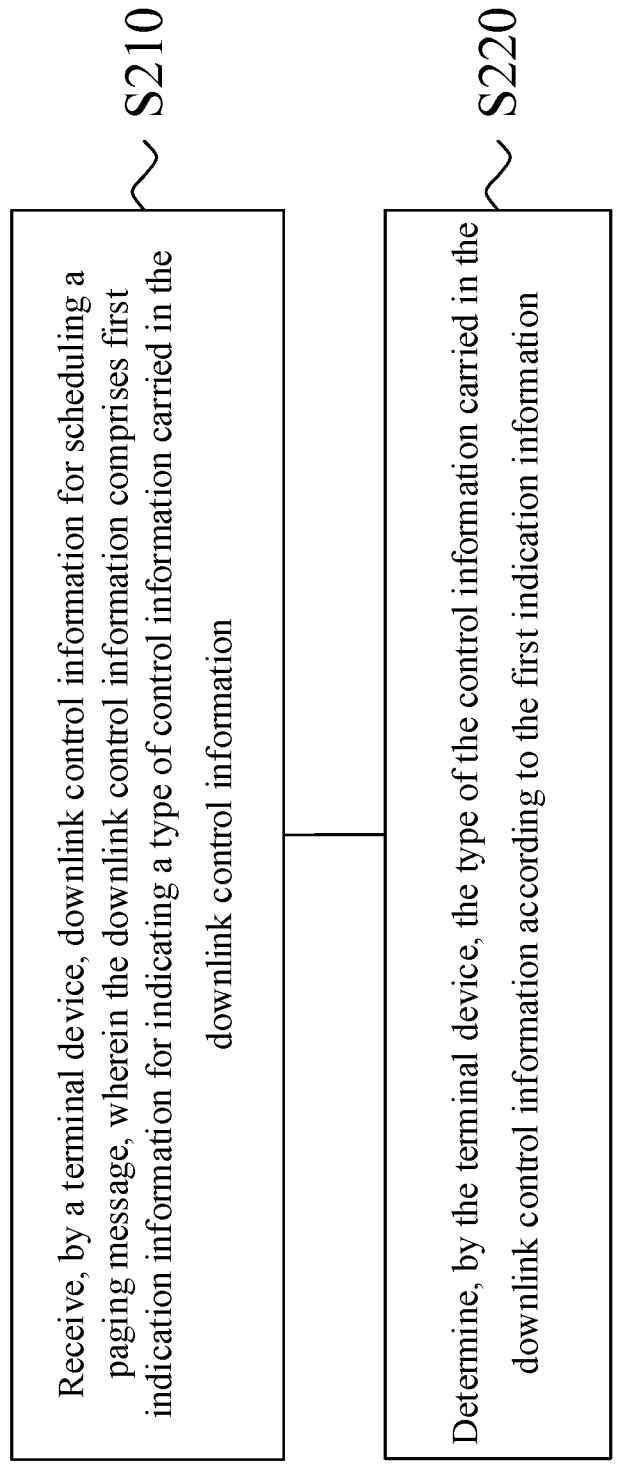
FIG. 2 is a schematic flowchart of a method for information transmission according to an embodiment of the present disclosure.

FIG. 2 is a schematic flowchart of a method 200 for information transmission according to an embodiment of the present disclosure. The method 200 can be applied to the system shown in FIG. 1, but is not limited thereto. The method 200 includes at least part of the following contents.

In S210, the terminal device receives downlink control information for scheduling a paging message. The downlink control information includes first indication information, the first indication information being used for indicating a type of control information carried in the downlink control information.

According to exemplary embodiments, the terminal device may be in an RRC idle state or in an RRC connected state.

In S220, the terminal device determines the type of the control information carried in the downlink control information according to the first indication information.

According to embodiment, the type of the control information carried in the downlink control information includes at least one of the following type information:

scheduling information for PDSCH carrying the paging message, a short message, the scheduling information for the PDSCH carrying the paging message and the short message, or downlink control information for an enhanced paging mechanism in a Rel 16 version or higher.

According to embodiments, the short message includes at least one of a system information update indication, a commercial alerting indication, or an earthquake and tsunami warning indication.

According to embodiments, each type of information included in the short message corresponds to one bit, that is, the downlink control information may further include an indication bit for each type of information in the short message. Each type of information included in the short message corresponds to one bit. For example, the system information update indication corresponds to bit A. When the value of bit A is 0, it indicates that the short message does not contain the system information update indication. When the value of bit A is 1, it indicates that the short message contains system information update indication. The commercial alerting indication may correspond to bit B. When the value of bit B is 0, it indicates that the short message does not contain the commercial alerting indication; when the value of bit B is 1, it indicates that the short message contains the commercial alerting indication. The earthquake and tsunami warning indication may correspond to bit C. When the value of bit C is 0, it indicates that the short message does not contain the earthquake and tsunami warning indication; when the value of bit C is 1, it indicates that the short message contains the earthquake and tsunami warning indication.

It should be noted that the transmission of paging messages may be further enhanced in Rel-16 and subsequent versions, which may lead to changes in the DCI for scheduling paging messages.

According to embodiments, the first indication information includes first indication bits.

When the first indication bits are first bits, the first indication information indicates that the type of the control information carried in the downlink control information is the scheduling information for the PDSCH carrying the paging message; or when the first indication bits are second bits, the first indication information indicates that the type of the control information carried in the downlink control information is the short message; or when the first indication bits are third bits, the first indication information indicates that the type of the control information carried in the downlink control information is the scheduling information for the PDSCH carrying the paging message and the short message; or when the first indication bits are fourth bits, the first indication information indicates that the type of the control information carried in the downlink control information is the downlink control information for the enhanced paging mechanism in the Rel 16 version or a subsequent higher version.

For example, the first indication bits include 2 bits. The first bits may be 00, the second bits may be 01, the third bits may be 10, and the fourth bits may be 11. That is, when the first indication bits are 00, the first indication information indicates that the type of the control information carried in the downlink control information is the scheduling information for the PDSCH carrying the paging message. When the first indication bits are 01, the first indication information indicates that the type of the control information carried in the downlink control information is the short message. When the first indication bits are 10, the first indication information indicates that the type of the control information carried in the downlink control information is the scheduling information for the PDSCH carrying the paging message and the short message. When the first indication bits are 11, the first indication information indicates that the type of the control information carried in the downlink control information is the downlink control information for the enhanced paging mechanism in the Rel 16 version or a subsequent higher version.

According to embodiments, when the first indication bits are the fourth bits, the type of the control information carried in the downlink control information further includes:

scheduling information for PDSCH carrying the paging message in the Rel 16 version or higher, a short message in the Rel 16 version or higher, or the scheduling information for the PDSCH carrying the paging message and the short message in the Rel 16 version or higher.

According to embodiment, the first indication information includes second indication bits for indicating the scheduling information for PDSCH carrying the paging message in the Rel 16 version or higher, or indicating the short message in the Rel 16 version or higher, or indicating the scheduling information for the PDSCH carrying the paging message and the short message in the Rel 16 version or higher.

For example, the first indication information may indicate the type of the control information carried in the downlink control information by combining the first indication bits and the second indication bits.

When the first indication bits are the fourth bits and the second indication bits are fifth bits, the first indication information indicates that the type of the control information carried in the downlink control information is the scheduling information for PDSCH carrying the paging message in the Rel 16 version or higher; or when the first indication bits are the fourth bits and the second indication bits are sixth bits, the first indication information indicates that the type of the control information carried in the downlink control information is the short message in the Rel 16 version or higher;

or when the first indication bits are the fourth bits and the second indication bits are seventh bits, the first indication information indicates that the type of the control information carried in the downlink control information is the scheduling information for the PDSCH carrying the paging message and the short message in the Rel 16 version or higher.

For example, the second indication bits include 2 bits. When the first indication bits indicate that the type of the control information carried in the downlink control information is the downlink control information for an enhanced paging mechanism in a Rel 16 version or higher, the fifth bits may be 00, the sixth bits may be 01, and the seventh bits may be 10. That is, when the second indication bits are 00, the first indication information indicates that the type of the control information carried in the downlink control information is the scheduling information for PDSCH carrying the paging message in a Rel 16 version or higher. When the second indication bits are 01, the first indication information indicates that the type of the control information carried in the downlink control information is the short message in the Rel 16 version or higher. When the second indication bits are 10, the first indication information indicates that the type of the control information carried in the downlink control information is the scheduling information for PDSCH carrying the paging message and the short message in the Rel 16 version or higher.

According to embodiments, the first indication information includes a third indication bit.

When the third indication bit is an eighth bit, the first indication information indicates that the type of the control information carried in the downlink control information is the scheduling information for the PDSCH carrying the paging message and the short message; or when the third indication bit is a ninth bit, the first indication information indicates that the type of the control information carried in the downlink control information is the short message.

According to embodiments, when the third indication bit is the ninth bit, there is a bit field for the scheduling information for the PDSCH carrying the paging message, and the bit field does not indicate the scheduling information.

According to embodiments, when the third indication bit is the ninth bit, there is no bit field for the scheduling information for the PDSCH carrying the paging message, and a bit field for carrying the short message is at a position for a short message in the downlink control information or at a position for scheduling information for the PDSCH carrying the paging message.

For example, the third indication bit occupies 1 bit. The eighth bit may be 0, and the ninth bit may be 1. That is, when the third indication bit is 0, the first indication information indicates that the type of the control information carried in the downlink control information is the scheduling information for the PDSCH carrying the paging message and the short message. When the third indication bit is 1, the first indication information indicates that the type of the control information carried in the downlink control information is the short message.

As an embodiment, as shown in Table 1, the first indication information includes first indication bits, and the first indication bits include 2 bits. According to the definition in Table 1, the 2 bits can indicate the type of the control information carried in the Downlink Control Information (DCI) for scheduling the paging message.

TABLE 1

| first indication bits | type of the control information carried in DCI |
| --- | --- |
| 00 | Only the scheduling information for PDSCH carrying the paging message is carried |
| 01 | Only short message is carried |
| 10 | Both the scheduling information for PDSCH carrying the paging message and the short message are carried |
| 11 | Downlink control information for an enhanced paging mechanism in a Rel 16 version or higher is carried |

It should be noted that if the first indication bit is "00", "01", and "10", although the type of the downlink control information in Rel-15 is indicated, terminal devices in Rel-16 and subsequent higher version can still use the type of the downlink control information in Ref-15.

For Rel-15 version terminal device, some combination of indication bits (the first indication bits are "11") is reserved, that is, the bit combination (the first indication bits are "11") is not used for Rel-15 terminal device to indicate the type of the control information.

The combination of the indication bits (the first indication bits are "11") is only used by terminal devices in Rel-16 and later versions to identify the control information type as the downlink control information corresponding to enhanced paging.

Further, when the first indication bits are "11", the first indication information further includes second indication bits. The second indication bits include 2 bits. According to the definition in Table 2, the 2 bits indicate the type of the control information carried in the DCI for scheduling the paging message.

TABLE 2

| second indication bits | type of the control information carried in DCI |
| --- | --- |
| 00 | The scheduling information for PDSCH carrying the paging message in a Rel 16 version or higher is carried |
| 01 | Short message in a Rel 16 version or higher is carried |
| 10 | Both the scheduling information for PDSCH carrying the paging message and the short message in a Rel 16 version or higher are carried |

As an embodiment, as shown in Table 3, the first indication information includes a third indication bit. The third indication bit occupies 1 bit. According to the definition in Table 3, the 1 bit indicates the type of the control information carried in the DCI for scheduling the paging message.

TABLE 3

| third indication bit | type of the control information carried in DCI |
| --- | --- |
| 0 | Both the scheduling information for PDSCH carrying the paging message and the short message are carried |
| 1 | Only short message is carried |

Therefore, in embodiments of the present disclosure, the first indication information in the downlink control information for scheduling the paging message can indicate the type of the control information carried in the downlink control information, so that the terminal device can determine the type of the control information carried in the downlink control information.

Further, the network device can flexibly use different downlink control information types depending on different situations, and also effectively control the total indication overhead.

Figure 3:
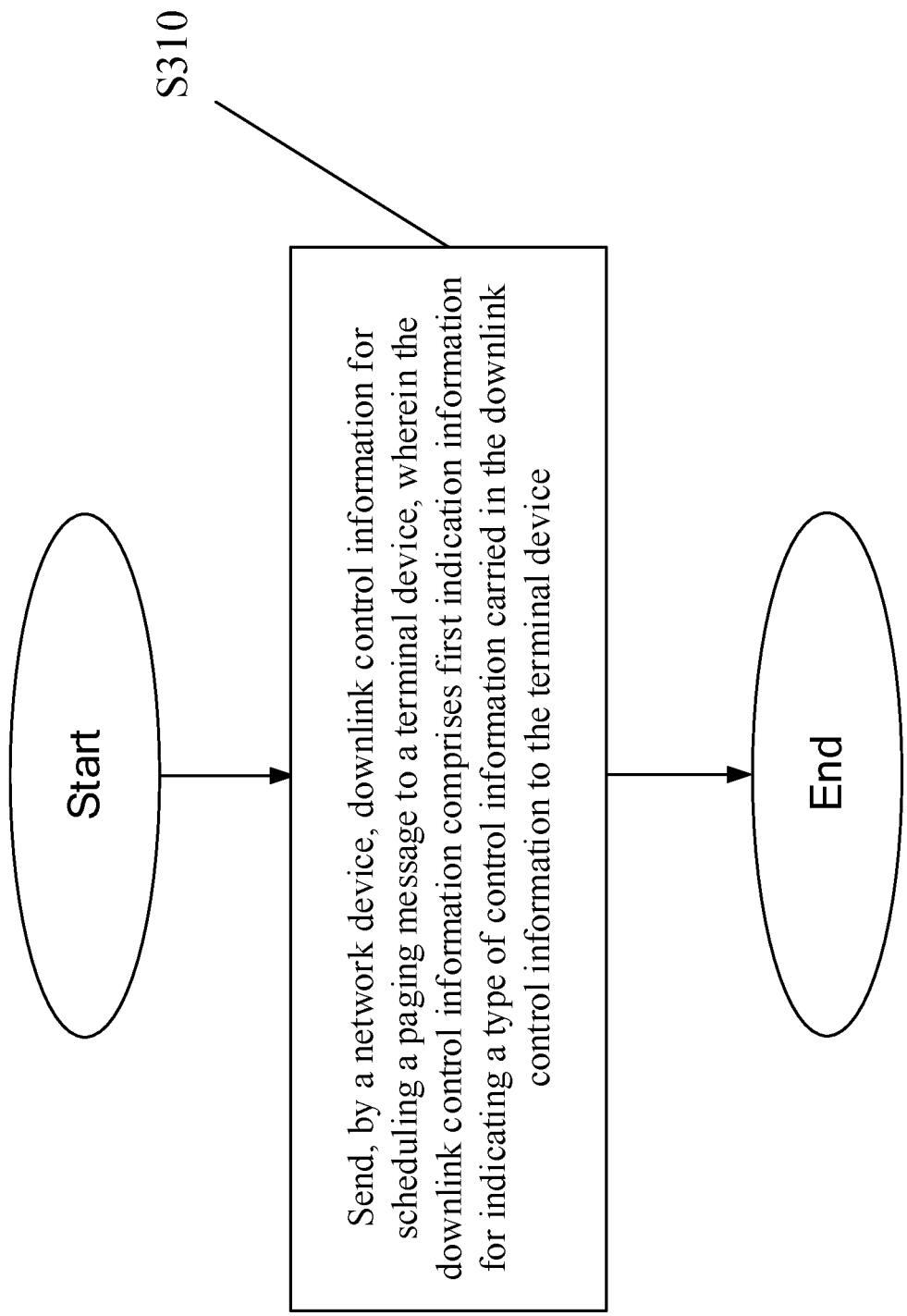
FIG. 3 is a schematic flowchart of a method for information transmission according to an embodiment of the present disclosure.

FIG. 3 is a schematic flowchart of a method 300 for information transmission according to an embodiment of the present disclosure. The method 300 can be applied to the system shown in FIG. 1, but is not limited thereto. The method 300 includes at least part of the following content.

In S310, a network device sends downlink control information for scheduling a paging message to a terminal device. The downlink control information includes first indication information, the first indication information being used for indicating a type of control information carried in the downlink control information to the terminal device.

According to exemplary embodiments, the type of the control information carried in the downlink control information includes at least one of the following type information:

scheduling information for PDSCH carrying the paging message, a short message, the scheduling information for the PDSCH carrying the paging message and the short message, or reserved information for a terminal device in Rel-15 version.

According to exemplary embodiments, the first indication information includes first indication bits, wherein:

when the first indication bits are first bits, the first indication information indicates that the type of the control information carried in the downlink control information is the scheduling information for the PDSCH carrying the paging message; or when the first indication bits are second bits, the first indication information indicates that the type of the control information carried in the downlink control information is the short message; or when the first indication bits are third bits, the first indication information indicates that the type of the control information carried in the downlink control information is the scheduling information for the PDSCH carrying the paging message and the short message; or when the first indication bits are fourth bits, the first indication information indicates that the type of the control information carried in the downlink control information is the reserved information for the terminal device in Rel-15 version.

As an example, as shown in Table 1, the first indication information includes first indication bits, and the first indication bits include 2 bits. According to the definition in Table 1, the 2 bits can indicate the type of the control information carried in the DCI for scheduling the paging message.

TABLE 1

| first indication bits | type of the control information carried in DCI |
|---|---|
| 00 | Only the scheduling information for PDSCH carrying the paging message is carried |
| 01 | Only short message is carried |
| 10 | Both the scheduling information for PDSCH carrying the paging message and the short message are carried |

TABLE 1-continued

| first indication bits | type of the control information carried in DCI |
|---|---|
| 11 | Downlink control information for an enhanced paging mechanism in a Rel-16 version or higher is carried |

It should be noted that if the first indication bit are "00", "01", and "10", although the type of the downlink control information in Rel-15 is indicated, terminal devices in Rel-16 and subsequent higher version can still use the type of the downlink control information in Ref-15.

For Rel-15 version terminal device, some combination of indication bits (the first indication bits are "11") is reserved, that is, the bit combination (the first indication bits are "11") is not used for Rel-15 terminal device to indicate the type of the control information.

The combination of the indication bits (the first indication bits are "11") is only used by terminal devices in Rel-16 and later versions to identify the control information type as the downlink control information corresponding to enhanced paging.

According to exemplary embodiments, the type of the control information carried in the downlink control information includes at least one of the following type information:

scheduling information for PDSCH carrying the paging message, a short message, the scheduling information for the PDSCH carrying the paging message and the short message, or downlink control information for an enhanced paging mechanism in a Rel 16 version or higher.

According to exemplary embodiments, the short message includes at least one of a system information update indication, a commercial alerting indication, or an earthquake and tsunami warning indication.

According to exemplary embodiments, the first indication information includes first indication bits, wherein:

when the first indication bits first bits, the first indication information indicates to the terminal device that the type of the control information carried in the downlink control information is the scheduling information for the PDSCH carrying the paging message; or when the first indication bits are second bits, the first indication information indicates to the terminal device that the type of the control information carried in the downlink control information is the short message; or when the first indication bits are third bits, the first indication information indicates to the terminal device that the type of the control information carried in the downlink control information is the scheduling information for the PDSCH carrying the paging message and the short message; or when the first indication bits are fourth bits, the first indication information indicates to the terminal device that the type of the control information carried in the downlink control information is the downlink control information for the enhanced paging mechanism in the Rel 16 version or higher.

According to exemplary embodiments, the first indication bits include 2 bits.

According to exemplary embodiments, when the first indication bits are the fourth bits, the type of the control information carried in the downlink control information further includes:

scheduling information for PDSCH carrying the paging message in the Rel 16 version or higher, a short message in the Rel 16 version or higher, or the scheduling information for the PDSCH carrying the paging message and the short message in the Rel 16 version or higher.

According to exemplary embodiments, the first indication information includes second indication bits for indicating the scheduling information for PDSCH carrying the paging message in the Rel 16 version or higher, the short message in the Rel 16 version or higher, or the scheduling information for the PDSCH carrying the paging message and the short message in the Rel 16 version or higher.

For example, the first indication information may indicate the type of the control information carried in the downlink control information by combining the first indication bits and the second indication bits.

When the first indication bits are the fourth bits and the second indication bits are fifth bits, the first indication information indicates to the terminal device that the type of the control information carried in the downlink control information is the scheduling information for PDSCH carrying the paging message in the Rel 16 version or higher; or when the first indication bits are the fourth bits and the second indication bits are sixth bits, the first indication information indicates to the terminal device that the type of the control information carried in the downlink control information is the short message in the Rel 16 version or higher; or when the first indication bits are the fourth bits and the second indication bits are seventh bits, the first indication information indicates to the terminal device that the type of the control information carried in the downlink control information is the scheduling information for the PDSCH carrying the paging message and the short message in the Rel 16 version or higher.

According to exemplary embodiments, the second indication bits include 2 bits.

According to exemplary embodiments, the first indication information includes a third indication bit;

when the third indication bit is an eighth bit, the first indication information indicates that the type of the control information carried in the downlink control information is the scheduling information for the PDSCH carrying the paging message and the short message; or when the third indication bit is a ninth bit, the first indication information indicates that the type of the control information carried in the downlink control information is the short message.

According to exemplary embodiments, when the third indication bit is the ninth bit, there is a bit field for the scheduling information for the PDSCH carrying the paging message, and the bit field does not indicate the scheduling information.

According to exemplary embodiments, when the third indication bit is the ninth bit, there is no bit field for the scheduling information for the PDSCH carrying the paging message, and a bit field for carrying the short message is at a position for a short message in the downlink control information or at a position for scheduling information for the PDSCH carrying the paging message.

According to exemplary embodiments, the third indication bit includes 1 bit.

It should be understood that the steps in the method 300 for information transmission may correspond to steps in the method 200 for information transmission, and for the sake of brevity, repeated descriptions are omitted here.

Figure 4:
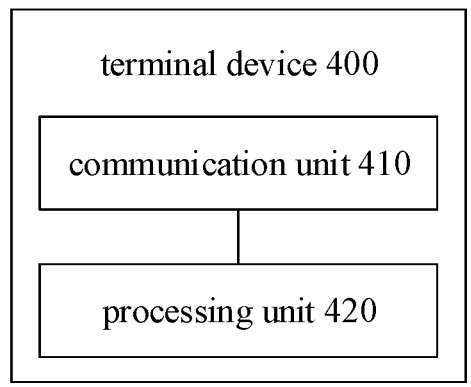
FIG. 4 is a schematic block diagram of a terminal device according to an embodiment of the present disclosure.

FIG. 4 is a schematic block diagram of a terminal device 400 according to an embodiment of the present disclosure.

As shown in FIG. 4, the terminal device 400 includes a communication unit 410 and a processing unit 420.

The communication unit 410 is configured to receive downlink control information for scheduling a paging message. The downlink control information includes first indication information, the first indication information being used for indicating a type of control information carried in the downlink control information.

The processing unit 420 is configured to determine the type of the control information carried in the downlink control information according to the first indication information.

According to exemplary embodiments, the type of the control information carried in the downlink control information includes at least one of the following type information:

scheduling information for PDSCH carrying the paging message, a short message, the scheduling information for the PDSCH carrying the paging message and the short message, or reserved information for a terminal device in Rel-15 version.

According to exemplary embodiments, the first indication information includes first indication bits, wherein:

when the first indication bits are first bits, the first indication information indicates that the type of the control information carried in the downlink control information is the scheduling information for the PDSCH carrying the paging message; or when the first indication bits are second bits, the first indication information indicates that the type of the control information carried in the downlink control information is the short message; or when the first indication bits are third bits, the first indication information indicates that the type of the control information carried in the downlink control information is the scheduling information for the PDSCH carrying the paging message and the short message; or when the first indication bits are fourth bits, the first indication information indicates that the type of the control information carried in the downlink control information is the reserved information for the terminal device in Rel-15 version.

As an embodiment, as shown in Table 1, the first indication information includes first indication bits, and the first indication bits include 2 bits. According to the definition in Table 1, the 2 bits can indicate the type of the control information carried in the DCI for scheduling the paging message.

TABLE 1

| first indication bits | type of the control information carried in DCI |
|---|---|
| 00 | Only the scheduling information for PDSCH carrying the paging message is carried |
| 01 | Only short message is carried |
| 10 | Both the scheduling information for PDSCH carrying the paging message and the short message are carried |
| 11 | Downlink control information for an enhanced paging mechanism in a Rel-16 version or higher is carried |

It should be noted that if the first indication bits are "00", "01", and "10", although the type of the downlink control information in Rel-15 is indicated, terminal devices in Rel-16 and subsequent higher version can still use the type of the downlink control information in Ref-15.

For Rel-15 version terminal device, some combination of indication bits (the first indication bits are "11") is reserved, that is, the bit combination (the first indication bits are "11") is not used for Rel-15 terminal device to indicate the type of the control information.

The combination of the indication bits (the first indication bits are "11") is only used by terminal devices in Rel-16 and later versions to identify the control information type as the downlink control information corresponding to enhanced paging.

According to exemplary embodiments, the type of the control information carried in the downlink control information includes at least one of the following type information:

scheduling information for PDSCH carrying the paging message, a short message, the scheduling information for the PDSCH carrying the paging message and the short message, or downlink control information for an enhanced paging mechanism in a Rel 16 version or higher.

According to exemplary embodiments, the short message includes at least one of a system information update indication, a commercial alerting indication, or an earthquake and tsunami warning indication.

According to exemplary embodiments, the first indication information includes first indication bits;

when the first indication bits are first bits, the first indication information indicates that the type of the control information carried in the downlink control information is the scheduling information for the PDSCH carrying the paging message; or when the first indication bits are second bits, the first indication information indicates that the type of the control information carried in the downlink control information is the short message; or when the first indication bits are third bits, the first indication information indicates that the type of the control information carried in the downlink control information is the scheduling information for the PDSCH carrying the paging message and the short message; or when the first indication bits are fourth bits, the first indication information indicates that the type of the control information carried in the downlink control information is the downlink control information for the enhanced paging mechanism in the Rel 16 version or higher.

According to exemplary embodiments, the first indication bits include 2 bits.

According to exemplary embodiments, when the first indication bits are the fourth bits, the type of the control information carried in the downlink control information further includes:

scheduling information for PDSCH carrying the paging message in the Rel 16 version or higher, a short message in the Rel 16 version or higher, or the scheduling information for the PDSCH carrying the paging message and the short message in the Rel 16 version or higher.

According to exemplary embodiments, the first indication information includes second indication bits for indicating the scheduling information for PDSCH carrying the paging message in the Rel 16 version or higher, the short message in the Rel 16 version or higher, or the scheduling information for the PDSCH carrying the paging message and the short message in the Rel 16 version or higher.

According to exemplary embodiments, when the first indication bits are the fourth bits and the second indication bits are fifth bits, the first indication information indicates that the type of the control information carried in the downlink control information is the scheduling information for PDSCH carrying the paging message in the Rel 16 version or higher; or when the first indication bits are the fourth bits and the second indication bits are sixth bits, the first indication information indicates that the type of the control information carried in the downlink control information is the short message in the Rel 16 version or higher; or when the first indication bits are the fourth bits and the second indication bits are seventh bits, the first indication information indicates that the type of the control information carried in the downlink control information is the scheduling information for the PDSCH carrying the paging message and the short message in the Rel 16 version or higher.

According to exemplary embodiments, the second indication bits include 2 bits.

According to exemplary embodiments, the first indication information includes a third indication bit, wherein:

when the third indication bit is an eighth bit, the first indication information indicates that the type of the control information carried in the downlink control information is the scheduling information for the PDSCH carrying the paging message and the short message; or when the third indication bit is a ninth bit, the first indication information indicates that the type of the control information carried in the downlink control information is the short message.

According to exemplary embodiments, when the third indication bit is the ninth bit, there is a bit field for the scheduling information for the PDSCH carrying the paging message, and the bit field does not indicate the scheduling information.

According to exemplary embodiments, when the third indication bit is the ninth bit, there is no bit field for the scheduling information for the PDSCH carrying the paging message, and a bit field for carrying the short message is at a position for a short message in the downlink control information or at a position for scheduling information for the PDSCH carrying the paging message.

According to exemplary embodiments, the third indication bit includes 1 bit.

It should be understood that the above and other operations and/or functions of each module in the terminal device 400 according to embodiments of the present disclosure are configured for implementing the corresponding processes performed by the terminal device in the method 200 in FIG. 2. For the sake of brevity, repeated descriptions are omitted here.

Figure 5:
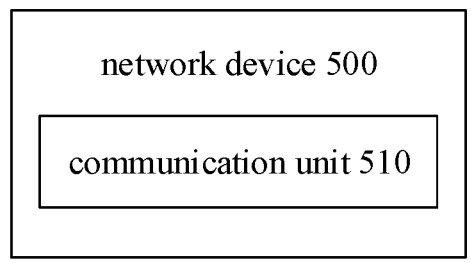
FIG. 5 is a schematic block diagram of a network device according to an embodiment of the present disclosure.

FIG. 5 is a schematic block diagram of a network device 500 according to an embodiment of the present disclosure. As shown in FIG. 5, the network device 500 includes a communication unit 510.

The communication unit 510 is configured to send downlink control information for scheduling a paging message to a terminal device. The downlink control information includes first indication information, the first indication information being used for indicating a type of control information carried in the downlink control information to the terminal device.

According to exemplary embodiments, the type of the control information carried in the downlink control information includes at least one of the following type information:

scheduling information for PDSCH carrying the paging message, a short message, the scheduling information for the PDSCH carrying the paging message and the short message, or reserved information for a terminal device in Rel-15 version.

According to exemplary embodiments, the first indication information includes first indication bits, wherein:

when the first indication bits are first bits, the first indication information indicates that the type of the control information carried in the downlink control information is the scheduling information for the PDSCH carrying the paging message; or when the first indication bits are second bits, the first indication information indicates that the type of the control information carried in the downlink control information is the short message; or when the first indication bits are third bits, the first indication information indicates that the type of the control information carried in the downlink control information is the scheduling information for the PDSCH carrying the paging message and the short message; or when the first indication bits are fourth bits, the first indication information indicates that the type of the control information carried in the downlink control information is the reserved information for the terminal device in Rel 15 version.

As an embodiment, as shown in Table 1, the first indication information includes first indication bits, and the first indication bits include 2 bits. According to the definition in Table 1, the 2 bits can indicate the type of the control information carried in the DCI for scheduling the paging message.

TABLE 1

| first indication bits | type of the control information carried in DCI |
| --- | --- |
| 00 | Only the scheduling information for PDSCH carrying the paging message is carried |
| 01 | Only short message is carried |
| 10 | Both the scheduling information for PDSCH carrying the paging message and the short message are carried |
| 11 | Downlink control information for an enhanced paging mechanism in a Rel-16 version or higher is carried |

It should be noted that if the first indication bits are "00", "01", and "10", although the type of the downlink control information in Rel-15 is indicated, terminal devices in Rel-16 and subsequent higher version can still use the type of the downlink control information in Ref-15.

For Rel-15 version terminal device, some combination of indication bits (the first indication bits are "11") is reserved, that is, the bit combination (the first indication bits are "11") is not used for Rel-15 terminal device to indicate the type of the control information.

The combination of the indication bits (the first indication bits are "11") is only used by terminal devices in Rel-16 and later versions to identify the control information type as the downlink control information corresponding to enhanced paging.

According to exemplary embodiments, the type of the control information carried in the downlink control information includes at least one of the following type information:

scheduling information for PDSCH carrying the paging message, a short message, the scheduling information for the PDSCH carrying the paging message and the short message, or downlink control information for an enhanced paging mechanism in a Rel 16 version or higher.

According to exemplary embodiments, the short message includes at least one of a system information update indication, a commercial alerting indication, an earthquake and tsunami warning indication.

According to exemplary embodiments, the first indication information includes a first indication bits, wherein:

when the first indication bits are first bits, the first indication information indicates to the terminal device that the type of the control information carried in the downlink control information is the scheduling information for the PDSCH carrying the paging message; or when the first indication bits are second bits, the first indication information indicates to the terminal device that the type of the control information carried in the downlink control information is the short message; or when the first indication bits are third bits, the first indication information indicates to the terminal device that the type of the control information carried in the downlink control information is the scheduling information for the PDSCH carrying the paging message and the short message; or when the first indication bits are fourth bits, the first indication information indicates to the terminal device that the type of the control information carried in the downlink control information is the downlink control information for the enhanced paging mechanism in the Rel 16 version or higher.

According to exemplary embodiments, the first indication bits include 2 bits.

According to exemplary embodiments, when the first indication bits are the fourth bits, the type of the control information carried in the downlink control information further includes:

scheduling information for PDSCH carrying the paging message in the Rel 16 version or higher, a short message in the Rel 16 version or higher, or the scheduling information for the PDSCH carrying the paging message and the short message in the Rel 16 version or higher.

According to exemplary embodiments, the first indication information includes second indication bits for indicating the scheduling information for PDSCH carrying the paging message in the Rel 16 version or higher, the short message in the Rel 16 version or higher, or the scheduling information for the PDSCH carrying the paging message and the short message in the Rel 16 version or higher.

According to exemplary embodiments, when the first indication bits are the fourth bits and the second indication bits are fifth bits, the first indication information indicates to the terminal device that the type of the control information carried in the downlink control information is the scheduling information for PDSCH carrying the paging message in the Rel 16 version or higher; or when the first indication bits are the fourth bits and the second indication bits are sixth bits, the first indication information indicates to the terminal device that the type of the control information carried in the downlink control information is the short message in the Rel 16 version or higher; or when the first indication bits are the fourth bits and the second indication bits are seventh bits, the first indication information indicates to the terminal device that the type of the control information carried in the downlink control information is the scheduling information for the PDSCH carrying the paging message and the short message in the Rel 16 version or higher.

According to exemplary embodiments, the second indication bits include 2 bits.

According to exemplary embodiments, the first indication information includes a third indication bit, when the third indication bit is an eighth bit, the first indication information indicates that the type of the control information carried in the downlink control information is the scheduling information for the PDSCH carrying the paging message and the short message; or when the third indication bits is a ninth bits, the first indication information indicates that the type of the control information carried in the downlink control information is the short message.

According to exemplary embodiments, when the third indication bit is the ninth bit, there is a bit field for the scheduling information for the PDSCH carrying the paging message, and the bit field does not indicate the scheduling information.

According to exemplary embodiments, when the third indication bit is the ninth bit, there is no bit field for the scheduling information for the PDSCH carrying the paging message, and a bit field for carrying the short message is at a position for a short message in the downlink control information or at a position for scheduling information for the PDSCH carrying the paging message.

According to exemplary embodiments, the third indication bit includes 1 bit.

It should be understood that the above and other operations and/or functions of each module in the network device 500 according to embodiments of the present disclosure are configured for implementing the corresponding processes performed by the network device in the method 300 in FIG. 3. For the sake of brevity, repeated descriptions are omitted here.

Figure 6:
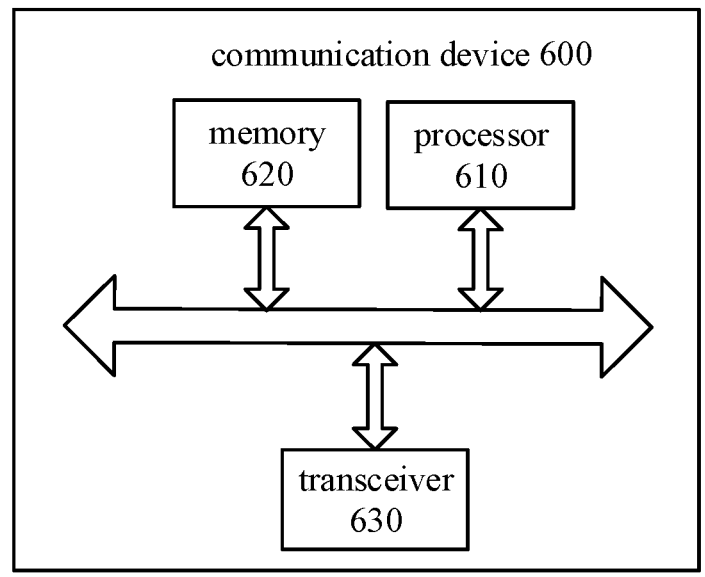
FIG. 6 is a schematic block diagram of a communication device according to an embodiment of the present disclosure.

FIG. 6 is a schematic block diagram of a communication device 600 according to an embodiment of the present disclosure. The communication device 600 in FIG. 6 includes a processor 610 which is configured to call and execute computer programs from a memory to perform the methods according to embodiments of the present disclosure.

According to embodiments, as shown in FIG. 6, the communication device 600 may further include a memory 620. The processor 610 may call and execute computer programs from the memory 620 to perform the methods according to embodiments of the present disclosure.

The memory 620 may be a separate device independent of the processor 610, or may be integrated in the processor 610.

According to embodiments, as shown in FIG. 6, the communication device 600 may further include a transceiver 630, and the processor 610 may control the transceiver 630 to communicate with other devices, specifically, may send information or data to other devices, or receive information or data sent by other devices.

The transceiver 630 may include a transmitter and a receiver. The transceiver 630 may further include one or more antennas.

According to embodiments, the communication device 600 may be a network device according to embodiments of the present disclosure, and the communication device 600 may implement the corresponding processes implemented by the network device in the methods according to embodiments of the present disclosure.

According to other embodiments, the communication device 600 may be the terminal device according to embodiments of the present disclosure, and the communication device 600 may implement the corresponding processes implemented by the terminal device in the methods according to embodiments of the present disclosure.

Figure 7:
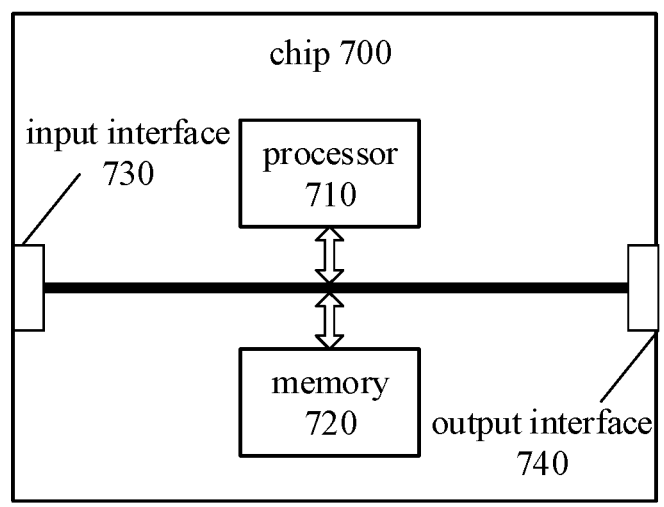
FIG. 7 is a schematic block diagram of a chip according to an embodiment of the present disclosure.

FIG. 7 is a schematic block diagram of a chip 700 according to an embodiment of the present disclosure. The chip 700 shown in FIG. 7 includes a processor 710, and the processor 710 can call and run a computer program stored a memory to implement the methods according to embodiments of the present disclosure.

According to embodiments, as shown in FIG. 7, the chip 700 may further include a memory 720. The processor 710 can call and run a computer program stored in the memory 720 to implement the methods according to embodiments of the present disclosure.

The memory 720 may be a separate device independent of the processor 710, or may be integrated in the processor 710.

According to embodiments, the chip 700 may further include an input interface 730. The processor 710 can control the input interface 730 to communicate with other devices or chips. Specifically, the processor 710 can control the input interface 730 to obtain information or data sent by other devices or chips.

According to embodiments, the chip 700 may further include an output interface 740. The processor 710 can control the output interface 740 to communicate with other devices or chips. Specifically, the processor 710 can control the output interface 740 to output information or data to other devices or chips.

According to embodiments, the chip can be applied to the network device in the embodiments of the present disclosure, and the chip can implement the corresponding processes implemented by the network device in methods according to embodiments of the present disclosure, and for brevity, repeated descriptions are omitted.

According to embodiments, the chip can be applied to the terminal device in the embodiments of the present disclosure, and the chip can implement the corresponding processes implemented by the terminal device in methods according to embodiments of the present disclosure, and for brevity, repeated descriptions are omitted.

It should be understood that the chips mentioned in the embodiments of the present disclosure may also be referred to as system-level chips, system chips, chip systems, or system-on-chip and so on.

The aforementioned processor may be a general-purpose processor, a Digital Signal Processor (DSP), a Field Programmable Gate Array (FPGA), an Application Specific Integrated Circuit (ASIC), or other programmable logic devices, transistor logic devices, discrete hardware components, and so on. The aforementioned general-purpose processor may be a microprocessor or any conventional processor.

The above-mentioned memory may be volatile memory or non-volatile memory, or may include both volatile and non-volatile memory. The non-volatile memory can be Read-Only Memory ROM), Programmable Read-Only Memory (PROM), Erasable Programmable Read-Only Memory (EPROM), Electronically Erasable Programmable Read-Only Memory (EEPROM) or flash memory. The volatile memory may be Random Access Memory (RAM).

It should be understood that the foregoing memory is exemplary but not limiting, for example, the memory in the embodiments of the present disclosure may also be Static Random Access Memory (SRAM), Dynamic Random Access Memory (DRAM), Synchronous Dynamic Random Access Memory (synchronous DRAM, SDRAM), Double Data Rate Synchronous Dynamic Random Access Memory (double data rate SDRAM, DDR SDRAM), Enhanced Synchronous Dynamic Random Access Memory (enhanced SDRAM, ESDRAM), synch link DRAM (SLDRAM) and Direct Rambus RAM (DR RAM), and so on. That is to say, the memory in the embodiments of the present disclosure includes but is not limited to these and any other suitable types of memories.

Figure 8:
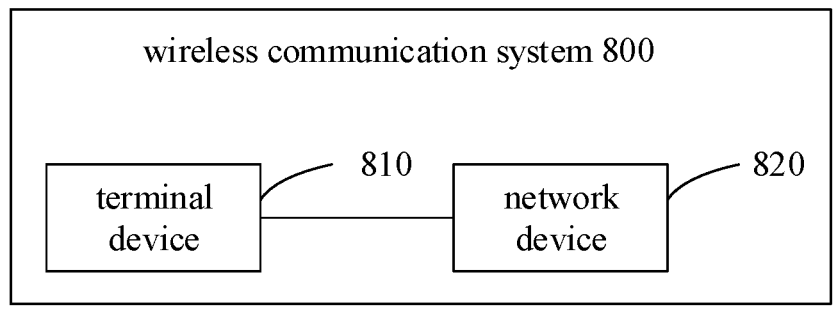
FIG. 8 is a schematic block diagram of a wireless communication system according to an embodiment of the present disclosure.

FIG. 8 is a schematic block diagram of a wireless communication system 800 according to an embodiment of the present disclosure. As shown in FIG. 8, the wireless communication system 800 includes a terminal device 810 and a network device 820. The terminal device 810 is configured to receive downlink control information for scheduling a paging message, wherein the downlink control information includes first indication information, the first indication information being used for indicating a type of control information carried in the downlink control information; and determine the type of the control information carried in the downlink control information according to the first indication information. The network device 820 is configured to send the downlink control information for scheduling the paging message to the terminal device, wherein the downlink control information includes the first indication information for indicating the type of the control information carried in the downlink control information to the terminal device.

The terminal device 810 can be used to implement the corresponding functions implemented by the terminal device in the above method 200, and the constituting components of the terminal device 810 can be as shown in the terminal device 400 in FIG. 4.

The network device 820 may be used to implement the corresponding functions implemented by the network device in the above method 300, and the constituting components of the network device 820 may be as shown in the network device 500 in FIG. 5.

The above embodiments can be implemented in whole or in part by software, hardware, firmware, or any combination thereof. When implemented using software, embodiments can be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general-purpose computer, a dedicated computer, a computer network, or other programmable devices. The computer instructions may be stored in a computer-readable storage medium or transmitted from one computer-readable storage medium to another computer-readable storage medium. For example, the computer instructions may be transmitted from a website site, a computer, a server or a data center in a wired manner (such as coaxial cable, optical fiber, digital subscriber line (DSL)) or in a wireless manner (such as infrared, wireless, microwave, etc.) to another website, another computer, another server or another data center. The computer-readable storage medium may be any available medium that can be accessed by a computer or a data storage device such as a server including one or more available integrated mediums, or a data center. The available medium may be a magnetic medium (for example, a floppy disk, a hard disk, a magnetic tape), an optical medium (for example, a DVD), or a semiconductor medium (for example, a solid state disk (SSD)).

It should be understood that in various embodiments of the present disclosure, the sequence numbers of the above processes do not mean that the execution order is sequential, and the execution order of processes should be determined by their functions and inherent logic, and embodiments of the present disclosure should not be interpreted as being limited to the execution order as described herein.

Those skilled in the art can clearly understand that for the convenience and conciseness of the description, the specific working processes of the systems, devices and units can be found in the previous description regarding corresponding processes in the foregoing method embodiments, which will not be repeated here.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for information transmission, comprising:
   receiving, by a terminal device, downlink control information for scheduling a paging message, wherein the downlink control information comprises first indication information, the first indication information being used for indicating a type of control information carried in the downlink control information; and
   determining, by the terminal device, the type of the control information carried in the downlink control information according to the first indication information,
   wherein the type of the control information carried in the downlink control information is one of the following types:
   scheduling information for Physical Downlink Shared Channel (PDSCH) carrying the paging message,
   a short message, or
   the scheduling information for the PDSCH carrying the paging message and the short message;
   wherein the terminal device is a 3rd Generation Partnership Project (3GPP) release 15 version terminal device, the first indication information comprises first indication bits, a length of the first indication bits is two bits, and a part of combinations of indication bits in the first indication bits is not used for indicating the type of the control information.

2. The method according to claim 1, wherein the short message comprises at least one of a system information update indication, a commercial alerting indication, or an earthquake and tsunami warning indication.

3. The method according to claim 1, wherein the first indication information comprises first indication bits and a length of the first indication bits is two bits, wherein:
   when the first indication bits are first combination of two bits, the first indication information indicates that the type of the control information carried in the downlink control information is the scheduling information for the PDSCH carrying the paging message; or
   when the first indication bits are second combination of two bits, the first indication information indicates that the type of the control information carried in the downlink control information is the short message; or when the first indication bits are third combination of two bits, the first indication information indicates that the type of the control information carried in the downlink control information is the scheduling information for the PDSCH carrying the paging message and the short message.

4. A method for information transmission, comprising:
sending, by a network device, downlink control information for scheduling a paging message to a terminal device, wherein the downlink control information comprises first indication information, the first indication information being used for indicating a type of control information carried in the downlink control information to the terminal device;
wherein the type of the control information carried in the downlink control information is one of the following types:
scheduling information for Physical Downlink Shared Channel (PDSCH) carrying the paging message,
a short message, or
the scheduling information for the PDSCH carrying the paging message and the short message;
wherein the terminal device is a 3rd Generation Partnership Project (3GPP) release 15 version terminal device, the first indication information comprises first indication bits, a length of the first indication bits is two bits, and a part of combinations of indication bits in the first indication bits is not used for indicating the type of the control information.

5. The method according to claim 4, wherein the short message comprises at least one of a system information update indication, a commercial alerting indication, or an earthquake and tsunami warning indication.

6. The method according to claim 4, wherein the first indication information comprises first indication bits and a length of the first indication bits is two bits, wherein:
when the first indication bits are first combination of two bits, the first indication information indicates that the type of the control information carried in the downlink control information is the scheduling information for the PDSCH carrying the paging message; or
when the first indication bits are second combination of two bits, the first indication information indicates that the type of the control information carried in the downlink control information is the short message; or
when the first indication bits are third combination of two bits, the first indication information indicates that the type of the control information carried in the downlink control information is the scheduling information for the PDSCH carrying the paging message and the short message.

7. A terminal device, comprising:
a processor;
a memory; and
a plurality of instructions stored in the memory that, when executed by the processor, cause the terminal device to:
receive downlink control information for scheduling a paging message, wherein the downlink control information comprises first indication information, the first indication information being used for indicating a type of control information carried in the downlink control information; and
determine the type of the control information carried in the downlink control information according to the first indication information;

wherein the type of the control information carried in the downlink control information is one of the following types:
scheduling information for Physical Downlink Shared Channel (PDSCH) carrying the paging message,
a short message, or
the scheduling information for the PDSCH carrying the paging message and the short message;
wherein the terminal device is a 3rd Generation Partnership Project (3GPP) release 15 version terminal device, the first indication information comprises first indication bits, a length of the first indication bits is two bits, and a part of combinations of indication bits in the first indication bits is not used for indicating the type of the control information.

8. The terminal device according to claim 7, wherein the short message comprises at least one of a system information update indication, a commercial alerting indication, or an earthquake and tsunami warning indication.

9. The terminal device according to claim 7, wherein the first indication information comprises first indication bits and a length of the first indication bits is two bits, wherein:
when the first indication bits are first combination of two bits, the first indication information indicates that the type of the control information carried in the downlink control information is the scheduling information for the PDSCH carrying the paging message; or
when the first indication bits are second combination of two bits, the first indication information indicates that the type of the control information carried in the downlink control information is the short message; or
when the first indication bits are third combination of two bits, the first indication information indicates that the type of the control information carried in the downlink control information is the scheduling information for the PDSCH carrying the paging message and the short message.

10. A network device, comprising:
a processor;
a memory; and
a plurality of instructions stored in the memory that, when executed by the processor, cause the network device to:
send downlink control information for scheduling a paging message to a terminal device, wherein the downlink control information comprises first indication information, the first indication information being used for indicating a type of control information carried in the downlink control information to the terminal device;
wherein the type of the control information carried in the downlink control information is one of the following type:
scheduling information for Physical Downlink Shared Channel (PDSCH) carrying the paging message,
a short message, or
the scheduling information for the PDSCH carrying the paging message and the short message;
wherein the terminal device is a 3rd Generation Partnership Project (3GPP) release 15 version terminal device, the first indication information comprises first indication bits, a length of the first indication bits is two bits, and a part of combinations of indication bits in the first indication bits is not used for indicating the type of the control information.

11. The network device according to claim 10, wherein the short message comprises at least one of a system information update indication, a commercial alerting indication, or an earthquake and tsunami warning indication.

12. The network device according to claim 10, wherein the first indication information comprises first indication bits and a length of the first indication bits is two bits, wherein:
- when the first indication bits are first combination of two bits, the first indication information indicates that the type of the control information carried in the downlink control information is the scheduling information for the PDSCH carrying the paging message; or
- when the first indication bits are second combination of two bits, the first indication information indicates that the type of the control information carried in the downlink control information is the short message; or
- when the first indication bits are third combination of two bits, the first indication information indicates that the type of the control information carried in the downlink control information is the scheduling information for the PDSCH carrying the paging message and the short message.

* * * * *